(12) United States Patent
Kang et al.

(10) Patent No.: US 12,541,268 B2
(45) Date of Patent: Feb. 3, 2026

(54) ELECTRONIC DEVICE AND METHOD OF TESTING ELECTRONIC DEVICE

(71) Applicant: Samsung Display Co., Ltd., Yongin-Si (KR)

(72) Inventors: Bongil Kang, Yongin-si (KR); Jun-Young Ko, Yongin-si (KR); Sangkook Kim, Yongin-si (KR); Taejoon Kim, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 19/059,258

(22) Filed: Feb. 21, 2025

(65) Prior Publication Data
US 2025/0315128 A1 Oct. 9, 2025

(30) Foreign Application Priority Data
Apr. 4, 2024 (KR) .................. 10-2024-0046124

(51) Int. Cl.
*G06F 3/041* (2006.01)
*G06F 3/044* (2006.01)
*G09G 3/32* (2016.01)

(52) U.S. Cl.
CPC ........ *G06F 3/0418* (2013.01); *G06F 3/04164* (2019.05); *G09G 3/32* (2013.01); *G06F 3/044* (2013.01); *G06F 2203/04111* (2013.01); *G09G 2300/0426* (2013.01); *G09G 2330/021* (2013.01)

(58) Field of Classification Search
CPC .... G06F 3/04164; G06F 3/0418; G06F 3/044; G06F 2203/04111; G09G 3/32; G09G 2300/0426; G09G 2330/021
See application file for complete search history.

(56) References Cited

U.S. PATENT DOCUMENTS

| | | | |
|---|---|---|---|
| 11,769,430 B2 * | 9/2023 | Ko | G09G 3/006 345/174 |
| 11,906,561 B2 | 2/2024 | Kang et al. | |
| 12,183,228 B2 * | 12/2024 | Ko | G06F 3/0412 |
| 2022/0206049 A1 * | 6/2022 | Kang | G09G 3/006 |
| 2023/0092537 A1 * | 3/2023 | Ko | G09G 3/006 345/174 |
| 2023/0410702 A1 * | 12/2023 | Ko | G06F 3/0412 |

* cited by examiner

*Primary Examiner* — Michael Pervan
(74) *Attorney, Agent, or Firm* — Innovation Counsel LLP

(57) ABSTRACT

An electronic device is disclosed that includes a display layer, a display driving unit, a sensor layer, a power driving unit, and a stabilization capacitor. The display layer includes a first electrode, a light emitting layer, and a second electrode. The display driving unit drives the display layer. The sensor layer is disposed on the display layer and includes a sensing electrode. The sensor driving unit drives the sensor layer. The power driving unit provides a power supply voltage to the second electrode. The stabilization capacitor controls the power supply voltage. The sensor driving unit operates in a detection mode to sense voltage data obtained by measuring a voltage between the second electrode and the sensing electrode.

20 Claims, 7 Drawing Sheets

ELECTRONIC DEVICE AND METHOD OF TESTING ELECTRONIC DEVICE

CROSS-REFERENCE TO RELATED APPLICATIONS

This application claims priority under 35 U.S.C. § 119 to Korean Patent Application No. 10-2024-0046124 filed on Apr. 4, 2024, in the Korean Intellectual Property Office, the disclosures of which are incorporated by reference herein in their entireties.

BACKGROUND

Embodiments of the present disclosure relate to an electronic device with improved sensing reliability and display quality.

An electronic device includes a display layer displaying an image, a display driving unit transmitting a signal to the display layer, a sensor layer located on the display layer, and a sensor driving unit transmitting a driving signal to the sensor layer.

The sensor layer which is a kind of information input device may be provided and used in the electronic device. As an example, the sensor layer may be attached on one surface of the display layer or may be integrally manufactured with the display layer. The user may input information by pushing or touching the sensor layer while viewing an image displayed on a screen of the electronic device.

SUMMARY

Embodiments of the present disclosure may provide an electronic device with improved sensing reliability and display quality.

According to an embodiment, an electronic device may include a display layer that includes a first electrode, a light emitting layer, and a second electrode, a display driving unit that drives the display layer, a sensor layer that is disposed on the display layer and includes a sensing electrode, a sensor driving unit that drives the sensor layer, a power driving unit that provides a power supply voltage to the second electrode, and a stabilization capacitor that controls the power supply voltage. The sensor driving unit may operate in a detection mode to sense voltage data obtained by measuring a voltage between the second electrode and the sensing electrode.

The display driving unit may operate in a normal mode or a high luminance mode. In the normal mode, the power supply voltage may have a first voltage level. In the high luminance mode, the power supply voltage may have a second voltage level lower than the first voltage level.

The display layer may emit light with higher luminance in the high luminance mode than in the normal mode.

The display driving unit may generate mode information, the display driving unit may transmit the mode information to the sensor driving unit, and the mode information may indicate that the display driving unit drive the display layer in the high luminance mode.

When the sensor driving unit receives the mode information, the sensor driving unit may operate in the detection mode.

The light emitting layer may include a plurality of light emitting layers including the light emitting layer. The plurality of light emitting layers may be covered by the second electrode.

The sensor driving unit may determine whether the stabilization capacitor is faulty, based on the voltage data.

The sensing electrode may include a first sensing electrode and a second sensing electrode intersecting the first sensing electrode and insulated from the first sensing electrode.

The sensor driving unit may further operate in a touch mode. In the touch mode, the sensor driving unit may generate a driving signal so as to be transmitted to the first sensing electrode.

In the detection mode, the first sensing electrode may be electrically connected to a ground electrode.

According to an embodiment, a method of testing an electronic device may include providing an electronic device that includes a display layer including a first electrode, a light emitting layer, and a second electrode, a display driving unit that drives the display layer, a sensor layer that includes a sensing electrode, a sensor driving unit that drives the sensor layer, a power driving unit that generates a power supply voltage, and a stabilization capacitor that controls the power supply voltage, providing the power supply voltage to the second electrode, sensing voltage data obtained by measuring a voltage between the second electrode and the sensing electrode, and determining whether the electronic device has an acceptable quality based on the voltage data.

The determining whether the electronic device has the acceptable quality based on the voltage data may include sensing a fluctuation range of the voltage data.

The sensing the fluctuation range of the voltage data may include determining that the stabilization capacitor is faulty when the fluctuation range is a greater than or equal to a given range.

The sensing the fluctuation range of the voltage data may further include determining that the stabilization capacitor has the acceptable quality when the fluctuation range is less than the given range.

The electronic device test method may further include operating the display layer in a normal mode or a high luminance mode. In the normal mode, the power supply voltage of the display layer may have a first voltage level. In the high luminance mode, the power supply voltage of the display layer may have a second voltage level lower than the first voltage level.

The display layer may emit light with a higher luminance in the high luminance mode than in the normal mode.

The electronic device test method may further include generating, by the display driving unit, mode information to be transmitted to the sensor driving unit, and the mode information may indicate that the display driving unit drives the display layer in the high luminance mode.

The sensing the voltage data may be performed after the sensor driving unit receives the mode information.

The sensing electrode may include a first sensing electrode and a second sensing electrode intersecting the first sensing electrode and insulated from the first sensing electrode, and the electronic device test method may further include generating, by the sensor driving unit, a driving signal to be transmitted to the first sensing electrode.

The sensing of the voltage data may include activating a switch to connect the second sensing electrode to a ground electrode.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
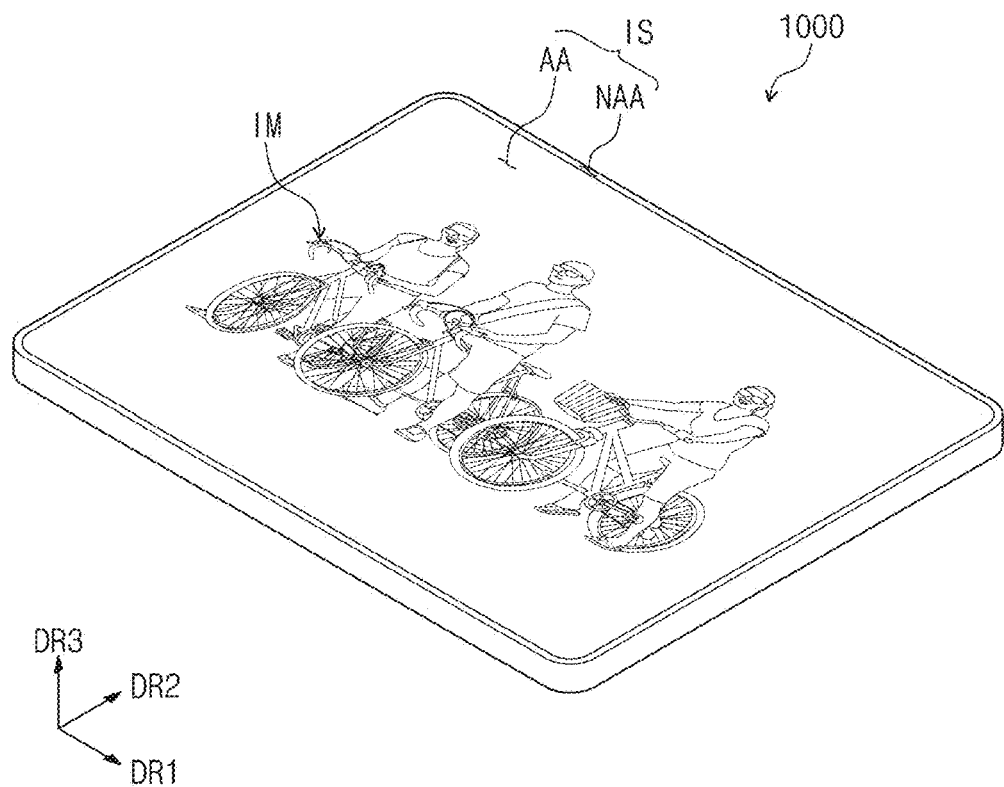
FIG. 1 is a perspective view of an electronic device according to an embodiment of the present disclosure.

In the specification, the expression that a first component (or an area, a layer, a part, or a portion) is "on", "connected to", or "coupled to" a second component means that the first component is directly on/connected to/coupled to the second component or it means that one or more components are interposed therebetween.

The same reference numerals/signs refer to the same components. In addition, in drawings, thicknesses, proportions, and dimensions of components may be exaggerated to describe the technical features effectively. As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

Although the terms "first", "second", etc. may be used to describe various components, the components should not be construed as being limited by the terms. The terms are only used to distinguish one component from another component. For example, without departing from the scope and spirit of the present inventive concept, a first component may be referred to as a "second component", and similarly, the second component may be referred to as the "first component". The singular forms are intended to include the plural forms unless the context clearly indicates otherwise.

Also, the terms "under", "below", "on", "above", etc. are used to describe the correlation of components illustrated in drawings. The terms that are relative in concept are described based on a direction shown in drawings.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the present disclosure will be described with reference to drawings.

FIG. 1 is a perspective view of an electronic device according to an embodiment of the present disclosure.

Referring to FIG. 1, an electronic device 1000 may be a device which is activated depending on an electrical signal. The electronic device 1000 according to the present disclosure may be a small and medium-sized electronic device, such as a mobile phone, a tablet, a notebook, an automotive navigation system, or a game console, as well as a large-sized electronic device such as a television or a monitor. The above electronic devices are provided only as an example, and it is obvious that the electronic device 1000 may be implemented with any other electronic device(s) unless departing from the inventive concept. The electronic device 1000 is in the shape of a rectangle having a long edge in a first direction DR1 and a short edge in a second direction DR2 intersecting the first direction DR1. However, the shape of the electronic device 1000 is not limited thereto. For example, the electronic device 1000 may be implemented in various shapes. The electronic device 1000 may display an image IM on a display surface IS parallel to each of the first direction DR1 and the second direction DR2, so as to face a third direction DR3. The display surface IS on which the image IM is displayed may correspond to a front surface of the electronic device 1000.

In an embodiment, a front surface (or an upper/top surface) and a rear surface (or a lower/bottom surface) of each member are defined with respect to a direction in which the image IM is displayed. The front surface and the rear surface may be opposite to each other in the third direction DR3, and the normal direction of each of the front surface and the rear surface may be parallel to the third direction DR3.

A separation distance between the front surface and the rear surface in the third direction DR3 may correspond to a thickness of the electronic device 1000 in the third direction DR3. Meanwhile, directions which the first to third directions DR1, DR2, and DR3 indicate may be relative in concept and may be changed to different directions.

The electronic device 1000 may sense an external input applied from the outside. The external input may include various types of inputs which are provided from the outside of the electronic device 1000. The electronic device 1000 according to an embodiment of the present disclosure may sense an external input of the user, which is applied from the outside. The external input of the user may be one of various types of external inputs such as a part of his/her body, a light, heat, his/her eye, or pressure or a combination thereof. Also, the electronic device 1000 may sense the external input of the user, which is applied to the side surface or rear surface of the electronic device 1000 depending on a structure of the electronic device 1000, and is not limited to any one embodiment. As an example of the present disclosure, the external input may include an input which is applied by using an input device (e.g., a stylus pen, an active pen, a touch pen, an electronic pen, or an E-pen).

The display surface IS of the electronic device 1000 may be divided into an active area AA and a non-active area NAA. The active area AA may refer to an area in which the image IM is displayed. The user visually perceives the image IM through the active area AA. In an embodiment, the active area AA is illustrated in the shape of a quadrangle whose vertexes are rounded. However, this is illustrated as an example. The active area AA may be implemented in various shapes and may not be limited to any one embodiment.

The non-active area NAA is adjacent to the active area AA. The non-active area NAA may have a given color. The non-active area NAA may surround the active area AA. Accordingly, the shape of the active area AA may be defined substantially by the non-active area NAA. However, this is illustrated as an example. For example, the non-active area NAA may be only disposed adjacent to one side of the active area AA or may be omitted. The electronic device 1000 according to an embodiment of the present disclosure may include various embodiments and is not limited to any one embodiment.

Figure 2:
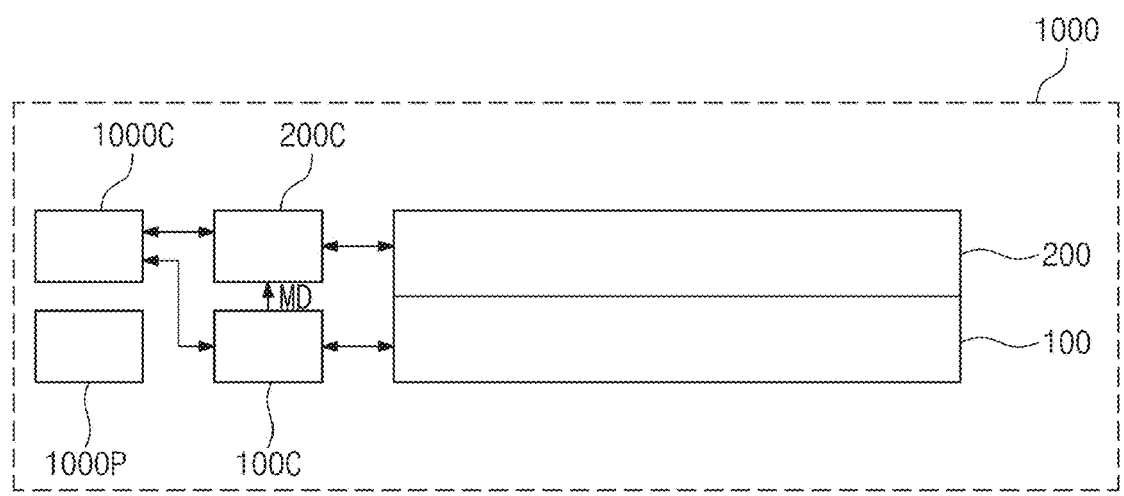
FIG. 2 is a diagram describing an operation of an electronic device according to an embodiment of the present disclosure.

FIG. 2 is a diagram for describing an operation of an electronic device according to an embodiment of the present disclosure.

Referring to FIG. 2, the electronic device 1000 may include a display layer 100, a sensor layer 200, a display driving unit 100C, a sensor driving unit 200C, a main driving unit 1000C, and a power driving unit 1000P.

The display layer 100 according to an embodiment of the present disclosure may be a light emitting display layer and is not particularly limited thereto. For example, the display layer 100 may be an organic light emitting display layer, a quantum dot display layer, a micro-LED display layer, or a nano-LED display layer. A light emitting layer of the organic light emitting display layer may include an organic light emitting material. A light emitting layer of the quantum dot display layer may include a quantum dot, a quantum rod, etc. A light emitting layer of the micro-LED display layer may include a micro-LED. A light emitting layer of the nano-LED display layer may include a nano-LED.

The sensor layer 200 may sense an input applied from the outside. The input may be applied by an input means capable of providing a change in the capacitance of the sensor layer 200 or an input means capable of causing an induced current in the sensor layer 200. For example, the input may be an input applied by using a passive type of input means, such as a body of the user, or a pen or an input applied by using an RFIC tag. For example, the pen may be a passive-type pen or an active-type pen.

The main driving unit 1000C may control all the operations of the electronic device 1000. For example, the main driving unit 1000C may control operations of the display driving unit 100C and the sensor driving unit 200C. The main driving unit 1000C may include at least one microprocessor and may further include a graphics processor. The main driving unit 1000C may be referred to as an "application processor", a "central processing unit", or a "main processor".

The display driving unit 100C may drive the display layer 100. The display driving unit 100C may receive image data and a control signal from the main driving unit 1000C. The control signal may include various signals. For example, the control signal may include an input vertical synchronization signal, an input horizontal synchronization signal, a main clock, a data enable signal, etc.

The sensor driving unit 200C may drive the sensor layer 200. The sensor driver 200C may receive a control signal from the main driving unit 1000C. The control signal may include a clock signal of the sensor driving unit 200C. Also, the control signal may further include a mode selection signal for selecting a driving mode of the sensor driving unit 200C and the sensor layer 200.

The sensor driving unit 200C may be implemented with an integrated circuit (IC) and may be electrically connected to the sensor layer 200. For example, the sensor driving unit 200C may be directly mounted on a given area of a display panel; for the electrical connection with the sensor layer 200, or the sensor driving unit 200C may be mounted on a separate printed circuit board in a chip-on-film (COF) manner.

The sensor driving unit 200C may calculate coordinate information of an input based on the signal received from the sensor layer 200 and may provide a coordinate signal including the coordinate information to the main driving unit 1000C. The main driving unit 1000C performs an operation corresponding to the user input based on the coordinate signal. For example, the main driving unit 1000C may drive the display driving unit 100C such that a new application image is displayed in the display layer 100.

The power driving unit 1000P may include a power management integrated circuit (PMIC). The power driving unit 1000P may generate a plurality of driving voltages for driving the display layer 100, the sensor layer 200, the display driving unit 100C, and the sensor driving unit 200C. For example, the plurality of driving voltages may include a high gate voltage, a low gate voltage, a first driving voltage (e.g., an ELVSS voltage), a second driving voltage (e.g., an ELVDD voltage), an initialization voltage, etc., but the present disclosure is not limited thereto. The first driving voltage may be referred to as a "power supply voltage".

Figure 6:
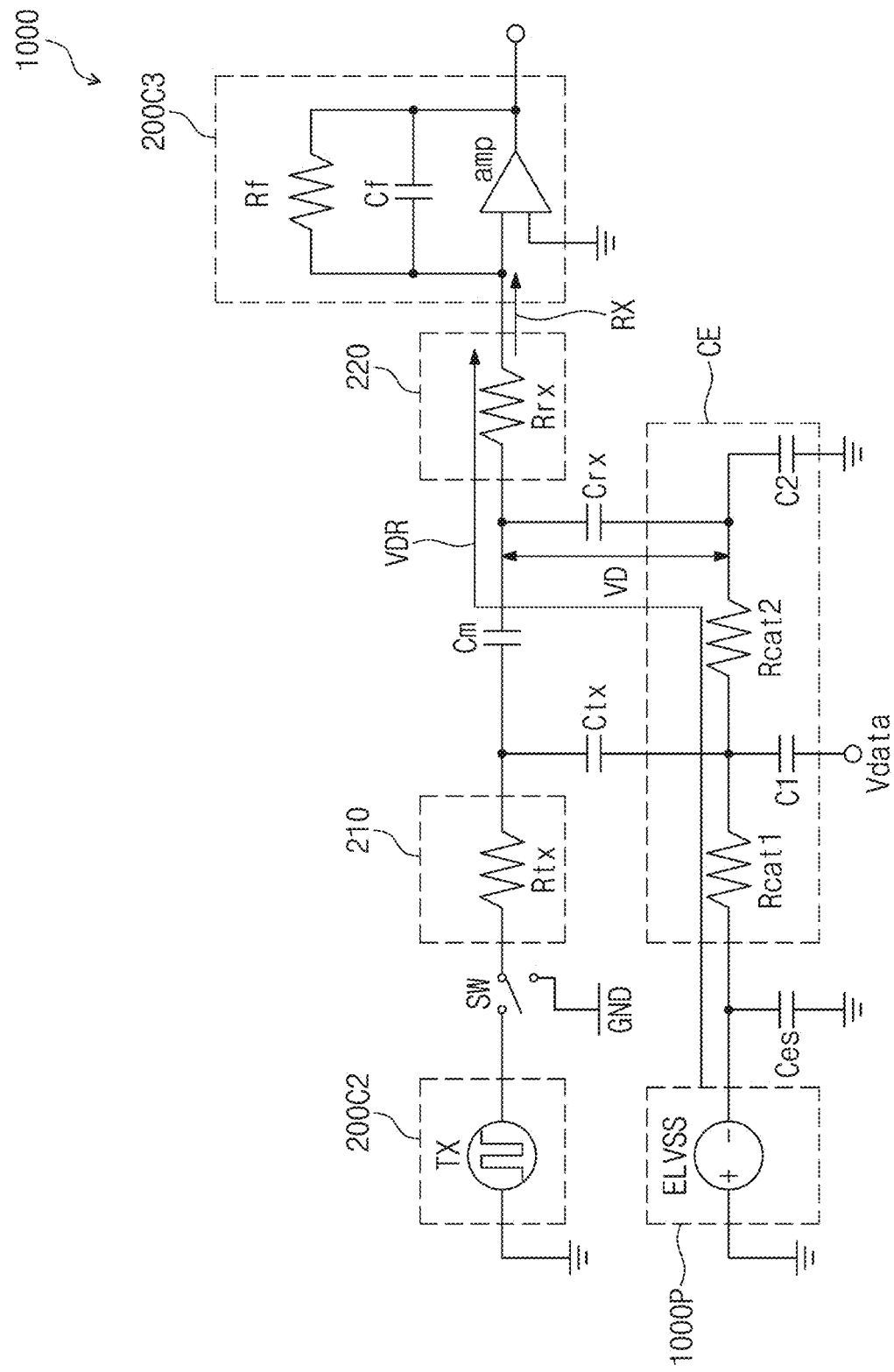
FIG. 6 is a circuit diagram of an electronic device according to an embodiment of the present disclosure.

The electronic device 1000 may further include a stabilization capacitor Ces (refer to FIG. 6). This will be described later.

The display driving unit 100C may operate in a normal mode and a high luminance mode. That is, the display driving unit 100C may drive the display layer 100 in the normal mode and the high luminance mode. The display layer 100 may emit light with higher luminance in the high luminance mode than in the normal mode.

The display driving unit 100C may generate mode information MD and may directly transmit the mode information MD to the sensor driving unit 200C. For example, the mode information MD may refer to information indicating that the display driving unit 100C drives the display layer 100 in the high luminance mode.

A connection line may be disposed between the display driving unit 100C and the sensor driving unit 200C. The connection line may electrically connect the display driving unit 100C and the sensor driving unit 200C. The mode information MD may be transferred through the connection line.

When the sensor driving unit 200C receives the mode information MD, the sensor driving unit 200C may operate in a detection mode. In the detection mode, the sensor driving unit 200C may sense voltage data obtained by measuring a voltage between the display layer 100 and the sensor layer 200. This will be described later.

Figure 3:
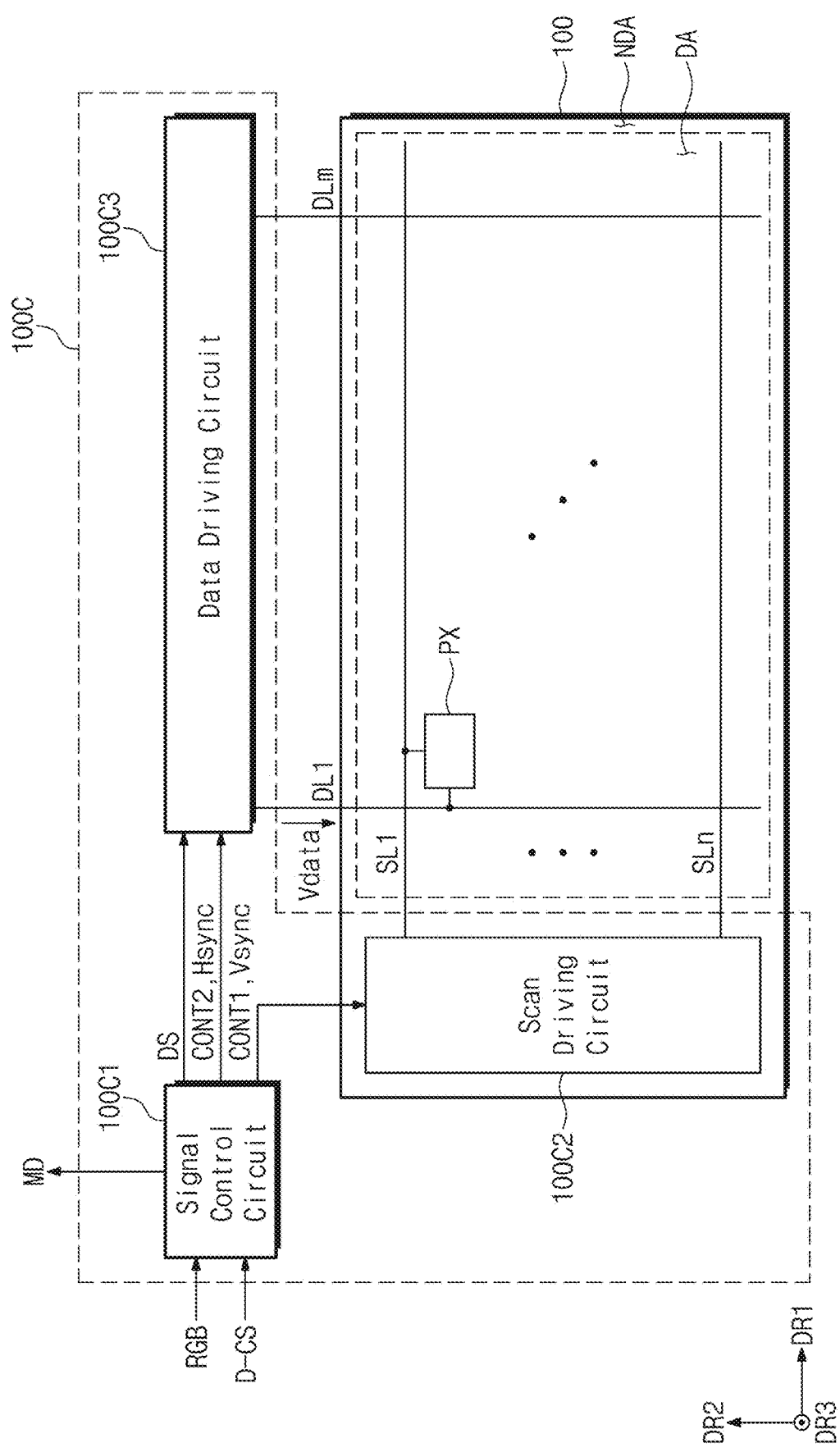
FIG. 3 is a block diagram of a display layer and a display driving unit according to an embodiment of the present disclosure.

FIG. 3 is a block diagram of a display layer and a display driving unit according to an embodiment of the present disclosure.

Referring to FIG. 3, the display layer 100 may include a plurality of scan lines SL1 to SLn, a plurality of data lines DL1 to DLm, and a plurality of pixels PX. Each of the plurality of pixels PX may be connected to a corresponding data line among the plurality of data lines DL1 to DLm and may be connected to a corresponding scan line among the plurality of scan lines SL1 to SLn. In an embodiment of the present disclosure, the display layer 100 may further include emission control lines, and the display driving unit 100C may further include an emission driving circuit which provides control signals to the emission control lines. A configuration of the display layer 100 is not particularly limited.

The display layer 100 may include a display area DA and a non-display area NDA. The display area DA may be defined as an area in which the image IM (refer to FIG. 1) is displayed. According to an embodiment, the display area DA may correspond to (or overlap) at least a portion of the active area AA (refer to FIG. 1).

The non-display area NDA is adjacent to the display area DA. The non-display area NDA may be an area where the image IM (refer to FIG. 1) is not substantially displayed. For example, the non-display area NDA may surround the display area DA. However, this is illustrated as an example, and the non-display area NDA may be defined in various shapes without limitation to any one embodiment. According to an embodiment, the non-display area NDA of the display layer 100 may correspond to (or overlap) at least a portion of the non-active area NAA (refer to FIG. 1).

The display driving unit 100C may include a signal control circuit 100C1, a scan driving circuit 100C2, and a data driving circuit 100C3.

The signal control circuit 100C1 may receive image data RGB and a control signal D-CS from the main driving unit 1000C (refer to FIG. 2). The control signal D-CS may include various signals. For example, the control signal D-CS may include an input vertical synchronization signal, an input horizontal synchronization signal, a main clock, a data enable signal, etc.

The signal control circuit 100C1 may output the mode information MD to the sensor driving unit 200C (refer to FIG. 2).

The signal control circuit 100C1 may generate a first control signal CONT1 and a vertical synchronization signal Vsync based on the control signal D-CS and may output the first control signal CONT1 and the vertical synchronization signal Vsync to the scan driving circuit 100C2. The vertical synchronization signal Vsync may be included in the first control signal CONT1.

The signal control circuit 100C1 may generate a second control signal CONT2 and a horizontal synchronization signal Hsync based on the control signal D-CS and may output the second control signal CONT2 and the horizontal synchronization signal Hsync to the data driving circuit 100C3. The horizontal synchronization signal Hsync may be included in the second control signal CONT2.

Also, the signal control circuit 100C1 may output a data signal DS, which is obtained by processing the image data RGB so as to satisfy an operating condition of the display layer 100, to the data driving circuit 100C3. The first control signal CONT1 and the second control signal CONT2 which are signals necessary for the operations of the scan driving circuit 100C2 and the data driving circuit 100C3 are not particularly limited.

The scan driving circuit 100C2 may drive the plurality of scan lines SL1 to SLn in response to the first control signal CONT1 and the vertical synchronization signal Vsync. In an embodiment of the present disclosure, the scan driving circuit 100C2 may be formed in the same process as a circuit layer 120 (refer to FIG. 5) in the display layer 100, but the present disclosure is not limited thereto. For example, the scan driving circuit 100C2 may be implemented with an integrated circuit (IC); for the electrical connection with the display layer 100, the integrated circuit may be directly mounted on a given area of the display layer 100 or may be mounted on a separate printed circuit board in a chip-on-film (COF) manner.

The data driving circuit 100C3 may output data grayscale voltages Vdata for driving the plurality of data lines DL1 to DLm in response to the second control signal CONT2, the horizontal synchronization signal Hsync, and the data signal DS from the signal control circuit 100C1. The data driving circuit 100C3 may be implemented with an integrated circuit; for the electrical connection with the display layer 100, the integrated circuit may be directly mounted on a given area of the display layer 100 or may be mount on a separate printed circuit board in the chip-on-film manner. However, the present disclosure is not limited thereto. For example, the data driving circuit 100C3 may be formed in the same process as the circuit layer 120 (refer to FIG. 5) in the display layer 100.

Figure 4:
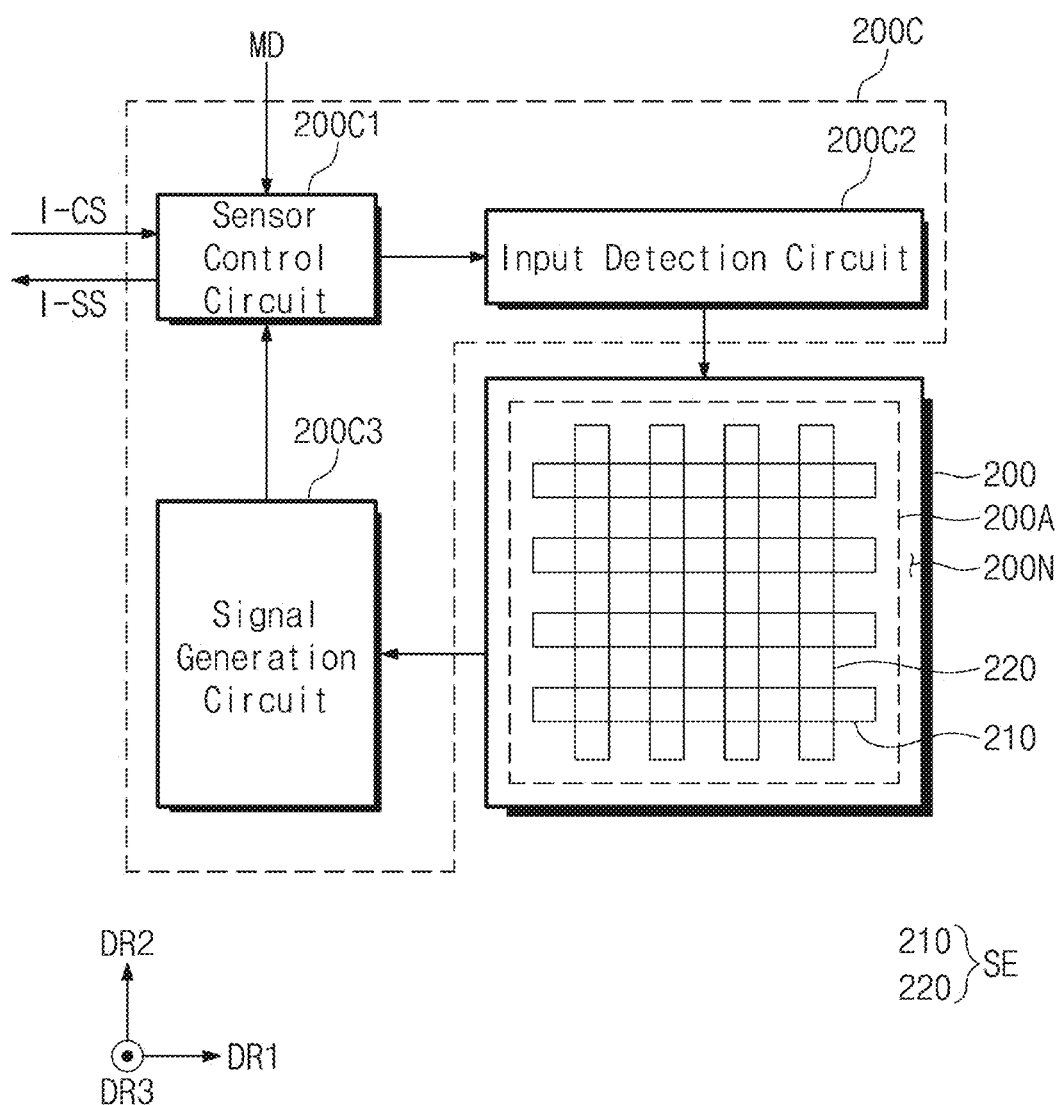
FIG. 4 is a block diagram of a sensor layer and a sensor driving unit according to an embodiment of the present disclosure.

FIG. 4 is a block diagram of a sensor layer and a sensor driving unit according to an embodiment of the present disclosure.

Referring to FIG. 4, an active area 200A and a surrounding area 200N may be defined in the sensor layer 200. The active area 200A may be an area which is activated depending on an electrical signal. For example, the active area 200A may be an area in which an input is sensed. The active area 200A may overlap the active area AA (refer to FIG. 1) of the electronic device 1000 (refer to FIG. 1). The surrounding area 200N may surround the active area 200A. The surrounding area 200N may overlap the non-active area NAA (refer to FIG. 1) of the electronic device 1000 (refer to FIG. 1).

The sensor layer 200 may include a sensing electrode SE. The sensing electrode SE may be provided in plurality, and the plurality of sensing electrodes SE may include a plurality of first sensing electrodes 210 and a plurality of second sensing electrodes 220. Each of the plurality of first sensing electrodes 210 may extend in the first direction DR1, and the plurality of first sensing electrodes 210 may be arranged to be spaced apart from each other in the second direction DR2. Each of the plurality of second sensing electrodes 220 may extend in the second direction DR2, and the plurality of second sensing electrodes 220 may be arranged to be spaced apart from each other in the first direction DR1.

The plurality of second sensing electrodes 220 may intersect the plurality of first sensing electrodes 210 and may be insulated from the plurality of first sensing electrodes 210. Each of the plurality of first sensing electrodes 210 and the plurality of second sensing electrodes 220 may be in the shape of a bar or a stripe. The above shape of the plurality of first sensing electrodes 210 and the plurality of second sensing electrodes 220 may improve a characteristic of sensing a continuous linear input. However, the shape of each of the plurality of first sensing electrodes 210 and the plurality of second sensing electrodes 220 is not limited thereto.

The sensor driving unit 200C may receive a touch control signal I-CS from the main driving unit 1000C (refer to FIG. 2) and may provide a coordinate signal I-SS to the main driving unit 1000C (refer to FIG. 2).

The sensor driving unit 200C may include a sensor control circuit 200C1, a signal generation circuit 200C2, and an input detection circuit 200C3. The sensor control circuit 200C1, the signal generation circuit 200C2, and the input detection circuit 200C3 may be implemented in a single chip. Alternatively, some of the sensor control circuit 200C1, the signal generation circuit 200C2, and the input detection circuit 200C3 and the other(s) thereof may be implemented in different chips from each other.

The sensor control circuit 200C1 may control the operation of the signal generation circuit 200C2, and the signal generation circuit 200C2 may calculate coordinates of an external input from a sensing signal received from the input detection circuit 200C3 or may analyze information transmitted from an external device from a modulation signal received from the input detection circuit 200C3.

The sensor control circuit 200C1 may receive the mode information MD from the display driving unit 100C (refer to FIG. 2).

The signal generation circuit 200C2 may provide the sensor layer 200 with an output signal, which may be referred to as a driving signal. The signal generation circuit 200C2 may output an output signal coinciding with an operating mode to the sensor layer 200.

The input detection circuit 200C3 may convert an output analog signal, which is received from the sensor layer 200 and may be referred to as a sensing signal, into a digital signal. The input detection circuit 200C3 may amplify and filter the received analog signal. Afterward, the input detection circuit 200C3 may convert the filtered signal into a digital signal.

Figure 5:
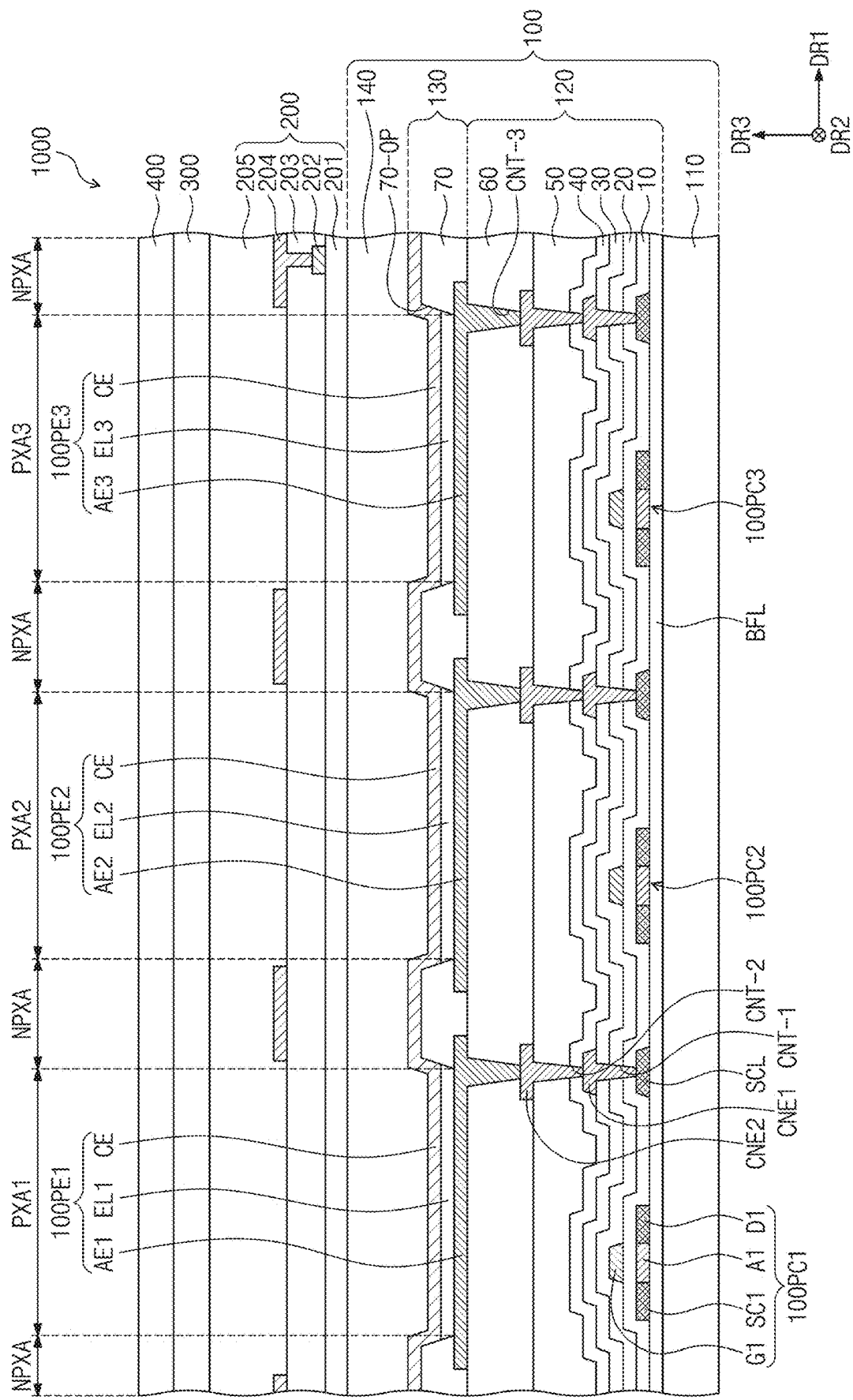
FIG. 5 is a cross-sectional view of an electronic device, according to an embodiment of the present disclosure.

FIG. 5 is a cross-sectional view of an electronic device according to an embodiment of the present disclosure.

Referring to FIG. 5, the electronic device 1000 may include the display layer 100, the sensor layer 200, an anti-reflection layer 300, and a window 400.

The display layer 100 may include a base layer 110, a circuit layer 120, a light emitting element layer 130, and an encapsulation layer 140.

The base layer 110 may be a member which provides a base surface on which the circuit layer 120 is disposed. The base layer 110 may be a glass substrate, a metal substrate, a polymer substrate, etc. However, an embodiment is not limited thereto. For example, the base layer 110 may be an inorganic layer, an organic layer or a composite material layer.

The base layer 110 may have a multi-layer structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a "base barrier layer".

Each of the first and second synthetic resin layers may include polyimide-based resin. Also, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, and perylene-based resin. In the specification, the wording "R-based resin" indicates that "R-based resin" includes the functional group of "R".

The circuit layer 120 may be disposed on the base layer 110. The circuit layer 120 may include an insulating layer, a semiconductor pattern, a conductive pattern, a signal line, etc. An insulating layer, a semiconductor layer, and a conductive layer may be formed on the base layer 110 through coating or deposition processes, and the insulating layer, the semiconductor layer, and the conductive layer may be selectively patterned through a plurality of photolithography processes to form the circuit layer 120.

At least one inorganic layer is formed on an upper surface of the base layer 110. The inorganic layer may include at least one of aluminum oxide, titanium oxide, silicon oxide, silicon nitride, silicon oxynitride, zirconium oxide, and hafnium oxide. The inorganic layer may be formed of multiple layers. The multiple inorganic layers may constitute a barrier layer or a buffer layer. In FIG. 5, the display layer 100 is illustrated as including a buffer layer BFL.

The buffer layer BFL may improve a bonding force between the base layer 110 and a semiconductor pattern. The buffer layer BFL may include at least one of silicon oxide, silicon nitride, and silicon oxynitride. For example, the buffer layer BFL may include a structure in which a silicon oxide layer and a silicon nitride layer are stacked alternately.

The semiconductor pattern may be disposed on the buffer layer BFL. The semiconductor pattern may include polysilicon. However, an embodiment is not limited thereto, and the semiconductor pattern may include amorphous silicon, low-temperature polycrystalline silicon, or an oxide semiconductor.

FIG. 5 shows only a portion of the semiconductor pattern, and the semiconductor pattern may be further disposed in another area. Semiconductor patterns may be arranged across pixels in a specific rule. An electrical property of the semiconductor pattern may vary depending on whether it is doped or not. The semiconductor pattern may include a first area having higher conductivity and a second area having lower conductivity. The first area may be doped with an N-type dopant or a P-type dopant. A P-type transistor may include a doping area doped with the P-type dopant, and an N-type transistor may include a doping area doped with the N-type dopant. The second area may be a non-doping area or may be an area doped at a concentration lower than the concentration of the first area.

A conductivity of the first area is greater than a conductivity of the second area. The first area may substantially serve as an electrode or a signal line. The second area may substantially correspond to an active area of a transistor. In other words, a portion of the semiconductor pattern may be an active area of a transistor, another portion thereof may be a source area or a drain area of the transistor, and the other portion may be a connection electrode or a connection signal line.

The plurality of pixels may include a plurality of first pixels, a plurality of second pixels, and a plurality of third pixels. Each of the plurality of pixels may be expressed by an equivalent circuit including seven transistors, one capacitor, and a light emitting element, and the equivalent circuit diagram of the pixel may be modified in various forms. A transistor and a light emitting element which are included in each of the pixels are illustrated in FIG. 5 as an example.

Each of the plurality of first pixels may include a first transistor 100PC1 and a first light emitting element 100PE1. Each of the plurality of second pixels may include a second transistor 100PC2 and a second light emitting element 100PE2. Each of the plurality of third pixels may include a third transistor 100PC3 and a third light emitting element 100PE3.

In each of the first transistor 100PC1, the second transistor 100PC2, and the third transistor 100PC3, a source area SC1, an active area A1, and a drain area D1 may be formed from the semiconductor pattern. In a cross-sectional view, the source area SC1 and the drain area D1 may extend in directions opposite to each other from the active area A1. A portion of a connection signal line SCL formed from the semiconductor pattern is illustrated in FIG. 5. Although not separately illustrated, in a plan view, the connection signal line SCL may be connected to the drain area D1 of the first transistor 100PC1.

A first insulating layer 10 may be disposed on the buffer layer BFL. The first insulating layer 10 may overlap a plurality of pixels in common and may cover the semiconductor pattern. The first insulating layer 10 may be an inorganic layer or an organic layer, and may have a single-layer or multi-layer structure. The first insulating layer 10 may include at least one of aluminum oxide, titanium oxide, silicon oxide, silicon nitride, silicon oxynitride, zirconium oxide, and hafnium oxide. In an embodiment, the first insulating layer 10 may be a single silicon oxide layer. Not only the first insulating layer 10 but also an insulating layer of the circuit layer 120 to be described later may be an inorganic layer or an organic layer, and may have a single-layer structure or a multi-layer structure. The inorganic layer may include at least one of the above-described materials, but the present disclosure is not limited thereto.

A gate G1 of each of the first transistor 100PC1, the second transistor 100PC2, and the third transistor 100PC3 is disposed on the first insulating layer 10. The gate G1 may be a portion of a metal pattern. The gate G1 overlaps the active area A1. The gate G1 may function as a mask in the process of doping the semiconductor pattern.

A second insulating layer 20 may be disposed on the first insulating layer 10 and may cover the gate G1. The second insulating layer 20 may overlap the pixels in common. The second insulating layer 20 may be an inorganic layer or an organic layer and may have a single-layer or multi-layer structure. The second insulating layer 20 may include at least one of silicon oxide, silicon nitride, and silicon oxynitride. In an embodiment, the second insulating layer 20 may have a multi-layer structure including a silicon oxide layer and a silicon nitride layer.

A third insulating layer 30 may be disposed on the second insulating layer 20. The third insulating layer 30 may have a single-layer or multi-layer structure. For example, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 penetrating the fourth insulating layer 40 and the fifth insulating layer 50.

A sixth insulating layer 60 may be disposed on the fifth insulating layer 50 and may at least partially cover the second connection electrode CNE2. The sixth insulating layer 60 may be an organic layer.

The light emitting element layer 130 may be disposed on the circuit layer 120. The light emitting element layer 130 may include the plurality of light emitting elements 100PE1, 100PE2, and 100PE3. For example, the light emitting element layer 130 may be an organic light emitting material, a quantum dot, a quantum rod, a micro LED, or a nano LED. Below, the description will be given under the condition that the plurality of light emitting elements 100PE1, 100PE2, and 100PE3 are implemented with an organic light emitting element, but the present disclosure is not limited thereto.

The first light emitting element 100PE1 may be electrically connected to the first transistor 100PC1. The light emitting element 100PE1 may include a first pixel electrode AE1, a first light emitting layer EL1, and the common electrode CE. The second light emitting element 100PE2 may be electrically connected to the second transistor 100PC2. The second light emitting element 100PE2 may include a second pixel electrode AE2, a second light emitting layer EL2, and the common electrode CE. The third light emitting element 100PE3 may be electrically connected to the third transistor 100PC3. The third light emitting element 100PE3 may include a third pixel electrode AE3, a third light emitting layer EL3, and the common electrode CE.

The first pixel electrode AE1, the second pixel electrode AE2, and the third pixel electrode AE3 may be disposed on the sixth insulating layer 60. Each of the first pixel electrode AE1, the second pixel electrode AE2, and the third connection electrode AE3 may be connected to the second connection electrode CNE2 through a contact hole CNT-3 penetrating the sixth insulating layer 60.

A pixel defining layer 70 may be disposed on the sixth insulating layer 60 and may cover a portion of the first pixel electrode AE1. An opening 70-OP is defined in the pixel defining layer 70. The opening 70-OP of the pixel defining layer 70 exposes at least a portion of each of the first pixel electrode AE1, the second pixel electrode AE2, and the third connection electrode AE3.

The display area DA (refer to FIG. 3) may include a first pixel area PXA1, a second pixel area PXA2, a third pixel area PXA3, and light blocking areas NPXA adjacent to the first pixel area PXA1, the second pixel area PXA2, and the third pixel area PXA3. The light blocking areas NPXA may surround the first pixel area PXA1, the second pixel area PXA2, and the third pixel area PXA3.

In this embodiment, the first pixel area PXA1, the second pixel area PXA2, and the third pixel area PXA3 are defined to respectively correspond to partial areas of the first pixel electrode AE1, the second pixel electrode AE2, and the third pixel electrode AE3 each exposed by the opening 70-OP.

The first light emitting layer EL1 may be disposed on the first pixel electrode AE1. The second light emitting layer EL2 may be disposed on the second pixel electrode AE2. The third light emitting layer EL3 may be disposed on the third pixel electrode AE3. Each of the first light emitting layer EL1, the second light emitting layer EL2, and the third light emitting layer EL3 may be disposed in an area corresponding to the opening 70-OP.

The common electrode CE may be disposed on the first to third light emitting layers EL1, EL2, and EL3. That is, the first to third light emitting layers EL1, EL2, and EL3 may be covered by the common electrode CE. The common electrode CE may have an integrated shape and may be disposed in the plurality of pixels in common.

Although not illustrated, a hole control layer may be disposed between the first pixel electrode AE1 and the first light emitting layer EL1. The hole control layer may be disposed in common in the first pixel area PXA1 and the light blocking area NPXA. The hole control layer may include a hole transport layer and may further include a hole injection layer. An electron control layer may be disposed between the first light emitting layer EL1 and the common electrode CE. The electron control layer may include an electron transport layer and may further include an electron injection layer. The hole control layer and the electron control layer may be formed in the plurality of pixels in common by using an open mask.

Each of the first to third pixel electrodes AE1, AE2, and AE3 may be referred to as a "first electrode", and the common electrode CE may be referred to as a "second electrode CE".

The encapsulation layer 140 may be disposed on the light emitting element layer 130. The encapsulation layer 140 may only include an inorganic layer, but layers constituting the encapsulation layer 140 are not limited thereto.

The inorganic layer may protect the light emitting element layer 130 from moisture and oxygen. The inorganic layer may include a silicon nitride layer, a silicon oxynitride layer, a silicon oxide layer, a titanium oxide layer, an aluminum oxide layer, etc.

The sensor layer 200 may include a base layer 201, a first conductive layer 202, a sensing insulating layer 203, a second conductive layer 204, and a cover insulating layer 205.

The base layer 201 may be an inorganic layer including at least one of silicon nitride, silicon oxynitride, and silicon oxide. Alternatively, the base layer 201 may be an organic layer including epoxy resin, acrylate resin, or imide-based resin. The base layer 201 may have a single-layer structure or may have a structure in which multiple layers are stacked in the third direction DR3.

Each of the first conductive layer 202 and the second conductive layer 204 may have a single-layer structure or may have a structure in which multiple layers are stacked in the third direction DR3. For example, the second conductive layer 204 may include the plurality of first sensing electrodes 210 (refer to FIG. 4). Each of the plurality of second sensing electrodes 220 (refer to FIG. 4) may include a sensing pattern and a bridge pattern electrically connected to the sensing pattern. The second conductive layer 204 may include the sensing pattern. That is, the sensing pattern and the plurality of first sensing electrodes 210 (refer to FIG. 4) may be disposed in the same layer. The first conductive layer 202 may include the bridge pattern. The bridge pattern may be disposed in a layer different from that of the sensing pattern and the plurality of first sensing electrodes 210 (refer to FIG. 4).

The single-layer structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), or indium zinc tin oxide (IZTO). In addition, the transparent conductive layer may include conductive polymer such as PEDOT, metal nanowire, graphene, etc.

The conductive layer of the multi-layer structure may include metal layers. The metal layers may have, for example, a three-layer structure of titanium/aluminum/titanium. The conductive layer of the multi-layer structure may include at least one metal layer and at least one transparent conductive layer.

At least one of the sensing insulating layer 203 and the cover insulating layer 205 may include an inorganic layer. The inorganic layer may include at least one of aluminum oxide, titanium oxide, silicon oxide, silicon nitride, silicon oxynitride, zirconium oxide, and hafnium oxide.

At least one of the sensing insulating layer 203 and the cover insulating layer 205 may include an organic layer. The organic layer may include at least one of acrylic-based resin, methacrylic-based resin, polyisoprene, vinyl-based resin, epoxy-based resin, urethane-based resin, cellulose-based resin, siloxane-based resin, polyimide-based resin, polyamide-based resin, and perylene-based resin.

The anti-reflection layer 300 may be disposed on the sensor layer 200. The anti-reflection layer 300 decreases the reflectance of an external light incident from above the window 400. In an embodiment of the present disclosure, the anti-reflection layer 300 may be omitted.

The window 400 may be disposed on the anti-reflection layer 300. The window 400 may include an optically transparent material. For example, the window 400 may include glass or plastic. The window 400 may be implemented in a multi-layer structure or a single-layer structure. For example, the window 400 may include a plurality of plastic films bonded by an adhesive or may have a glass substrate and a plastic film bonded by an adhesive.

FIG. 6 is a circuit diagram of an electronic device according to an embodiment of the present disclosure.

Referring to FIGS. 3 to 6, the electronic device 1000 may include the display layer 100, the display driving unit 100C, the sensor layer 200, the sensor driving unit 200C, the power driving unit 1000P, and the stabilization capacitor Ces.

The display layer 100 may include the common electrode CE. A first cathode resistance Rcat1, a second cathode resistance Rcat2, a first capacitor C1, and a second capacitor C2 may be defined in the common electrode CE.

Each of the first cathode resistance Rcat1 and the second cathode resistance Rcat2 may be a resistance of the common electrode CE.

The first capacitor C1 may indicate a parasitic capacitor formed between the common electrode CE and the plurality of data lines DL1 to DLm disposed in the display area DA.

The second capacitor C2 may indicate a parasitic capacitor formed between the common electrode CE and a ground electrode.

The display driving unit 100C may operate in the normal mode and the high luminance mode. That is, the display driving unit 100C may drive the display layer 100 in the normal mode and the high luminance mode. The display driving unit 100C may generate the mode information MD and may directly transmit the mode information MD to the sensor driving unit 200C. The mode information MD may refer to information indicating that the display driving unit 100C drives the display layer 100 in the high luminance mode.

The power driving unit 1000P may be electrically connected to the common electrode CE. The power driving unit 1000P may generate a voltage necessary to drive the display layer 100. The power driving unit 1000P may apply a first driving voltage ELVSS to the common electrode CE. The first driving voltage ELVSS may be referred to as a "power supply voltage ELVSS".

The stabilization capacitor Ces may be electrically connected to the common electrode CE. The stabilization capacitor Ces may remove or prevent the instant fluctuations in the first driving voltage. For example, when the first driving voltage ELVSS is instantly increased, the stabilization capacitor Ces may charge a voltage as much as the increment; when the first driving voltage ELVSS is instantly decreased, the stabilization capacitor Ces may discharge a voltage as much as the decrement such that the voltage level of the first driving voltage ELVSS is uniformly stabilized.

The stabilization capacitor Ces may be included in the power driving unit 1000P, but the present disclosure is not limited thereto. For example, the stabilization capacitor Ces may be included in the display layer 100.

The sensor layer 200 may include the first sensing electrode 210 and the second sensing electrode 220 intersecting the first sensing electrode 210 and insulated from the first sensing electrode 210. The first sensing electrode 210 may have a first resistance Rtx. The second sensing electrode 220 may have a second resistance Rrx.

A mutual capacitor Cm may be defined between the first sensing electrode 210 and the second sensing electrode 220.

A first sensing capacitor Ctx may indicate a parasitic capacitor formed between the common electrode CE and the first sensing electrode 210.

A second sensing capacitor Crx may indicate a parasitic capacitor formed between the common electrode CE and the second sensing electrode 220.

The sensor driving unit 200C may include a switch SW, a ground electrode GND, the signal generation circuit 200C2, and the input detection circuit 200C3.

The sensor driving unit 200C may operate in a touch mode. In the touch mode, the signal generation circuit 200C2 may be electrically connected to the first sensing electrode 210 by the switch SW. The input detection circuit 200C3 may be electrically connected to the second sensing electrode 220.

In the touch mode, the signal generation circuit 200C2 may transmit a driving signal TX to the first sensing electrode 210. When an external input is provided to the sensor layer 200, the input detection circuit 200C3 may receive a sensing signal RX that reflects a change in a capacitance of the mutual capacitor Cm between the first sensing electrode 210 and the second sensing electrode 220.

The input detection circuit 200C3 may convert the sensing signal RX from an analog signal to a digital signal. The input detection circuit 200C3 may amplify and filter the received analog signal. Afterward, the input detection circuit 200C3 may convert the filtered signal into the digital signal.

The input detection circuit 200C3 may include an amplifier amp, a capacitor Cf, and a resistor Rf. The input detection circuit 200C3 may be implemented with an analog front end (AFE) including the amplifier amp. The amplifier amp may include an operational (OP) amplifier. The amplifier amp may include a first input terminal, a second input terminal, and an output terminal.

The second sensing electrode 220 may be connected to the first input terminal of the amplifier amp. The capacitor Cf and the resistor Rf may be connected in parallel between the first input terminal and the output terminal of the amplifier amp. The second input terminal of the amplifier amp may be connected to a ground. The output terminal of the amplifier amp may output a signal corresponding to a voltage difference of the first input terminal and the second input terminal. The input detection circuit 200C3 may sense a change in the mutual capacitance between the first sensing electrode 210 and the second sensing electrode 220 based on the signal.

When the sensor driving unit 200C receives the mode information MD from the display driving unit 100C, the sensor driving unit 200C may operate in the detection mode different from the touch mode.

In the detection mode, a signal path VDR capable of measuring the first driving voltage ELVSS may be formed. For example, the signal path VDR may be defined by the power driving unit 1000P, the common electrode CE, the second sensing capacitor Crx, and the second sensing electrode 220. However, this is an example, and the signal path VDR according to an embodiment of the present disclosure is not limited thereto. For example, the signal path VDR may also be defined by the power driving unit 1000P, the common electrode CE, the first sensing capacitor Ctx, the mutual capacitor Cm, and the second sensing electrode 220.

Voltage data VD may be measured by the input detection circuit 200C3 through the signal path VDR. The voltage data VD may be a voltage obtained by measuring a voltage between the common electrode CE and the second sensing electrode 220. The input detection circuit 200C3 may sense the voltages data VD. The sensor driving unit 200C may determine whether the stabilization capacitor Ces is faulty (or abnormal), based on the voltage data VD.

When the mode information MD is received, the sensor control circuit 200C1 may allow the first sensing electrode 210 to be connected to not the signal generation circuit 200C2 but the ground electrode GND by using the switch SW. In the detection mode, the sensor driving unit 200C may not provide the driving signal TX to the first sensing electrode 210. In the detection mode, the first sensing electrode 210 may be electrically connected to the ground electrode GND.

According to the present disclosure, in the method of testing the electronic device 1000, when the sensor driving unit 200C receives the mode information MD, the sensor driving unit 200C may operate in the detection mode to test the stabilization capacitor Ces. The sensor driving unit 200C may determine whether the stabilization capacitor Ces is faulty, based on the voltage data VD obtained by measuring a voltage of the first and second sensing capacitors Ctx and Crx. When the electronic device 1000 is determined as having an acceptable quality, the stabilization capacitor Ces may remove an AC component from the first driving voltage ELVSS such that noise which hinders the driving of the touch mode is not transferred to the sensor layer 200 through the first and second sensing capacitors Ctx and Crx. Accordingly, the electronic device 1000 with an improved sensing reliability may be provided.

Also, according to the present disclosure, in the method of testing the electronic device 1000, when the sensor driving unit 200C receives the mode information MD, the sensor driving unit 200C may operate in the detection mode to test the stabilization capacitor Ces. The sensor driving unit 200C may determine whether the stabilization capacitor Ces is faulty, based on the voltage data VD obtained by measuring a voltage of the first and second sensing capacitors Ctx and Crx. When the electronic device 1000 is determined as having an acceptable quality, the stabilization capacitor Ces may remove a noise component capable of occurring at the first driving voltage ELVSS. The first driving voltage ELVSS with a uniform voltage level may be provided to the common electrode CE. Accordingly, the display device 100 with an improved display quality may be provided.

Figure 7:
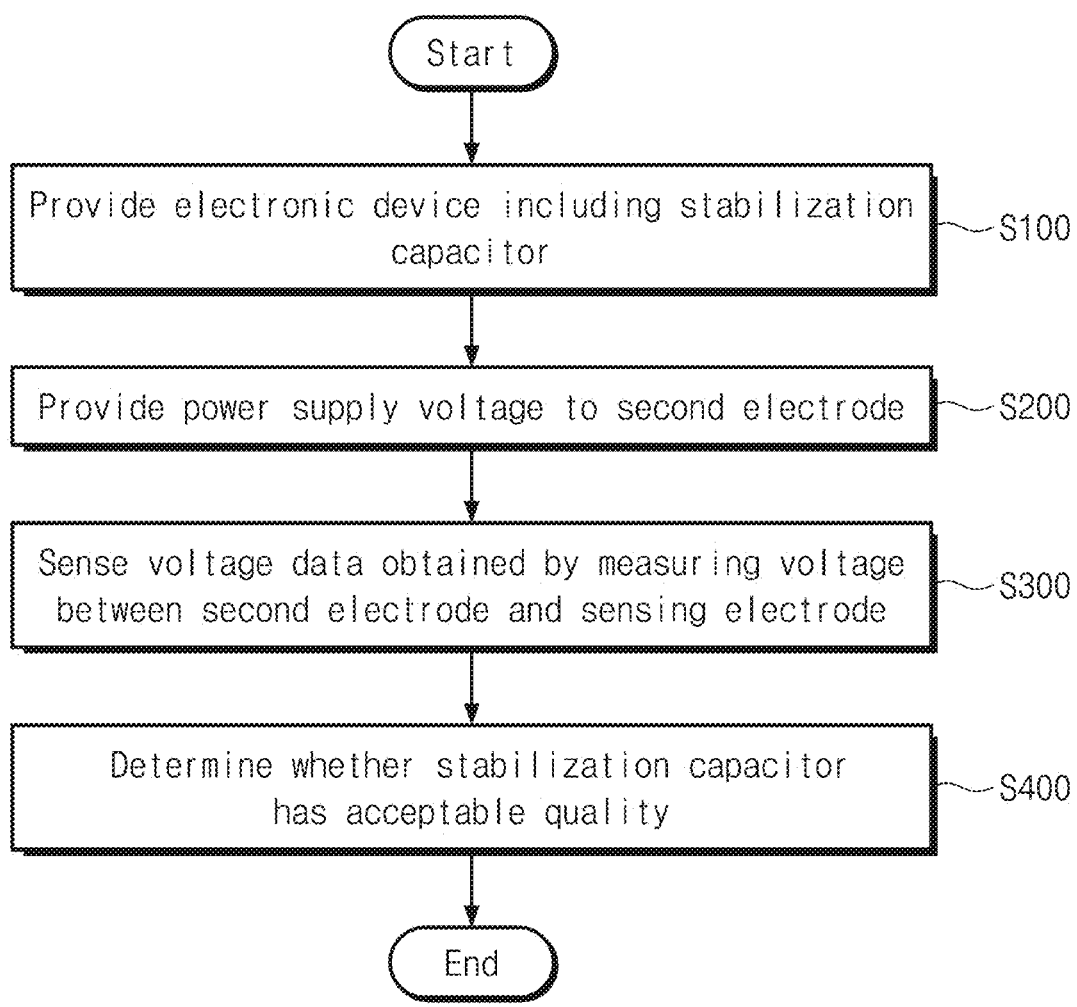
FIG. 7 is a flowchart an inspection method of an electronic device according to an embodiment of the present disclosure.

FIG. 7 is a flowchart an inspection method of an electronic device according to an embodiment of the present disclosure.

Referring to FIGS. 3 to 7, a method of testing an electronic device according to an embodiment of the present disclosure may include providing the electronic device including the stabilization capacitor Ces (S100), providing the power supply voltage ELVSS to the second electrode CE (S200), sensing the voltage data VD obtained by measuring a voltage between the second electrode CE and the sensing electrode SE (S300), and determining whether the stabilization capacitor Ces has an acceptable quality, based on the voltage data VD (S400).

The determining whether the stabilization capacitor Ces has an acceptable quality based on the voltage data VD (S400) may include sensing a fluctuation range of the voltage data VD.

The sensing of the fluctuation range of the voltage data VD may include determining the stabilization capacitor Ces as faulty when the fluctuation range is greater than or equal to a given range, and determining the stabilization capacitor Ces as having an acceptable quality when the fluctuation range is smaller than the given range.

The electronic device test method according to an embodiment of the present disclosure may further include generating, by the display driving unit 100C, the mode information MD so as to be transmitted to the sensor driving unit 200C. The sensing of the voltage data VD obtained by measuring the voltage between the second electrode CE and the sensing electrode SE (S300) may be performed after the generating the mode information MD.

The sensing of the voltage data VD obtained by measuring the voltage between the second electrode CE and the sensing electrode SE (S300) may further include electrically connecting the second sensing electrode 220 and the ground electrode GND.

Figure 8A:
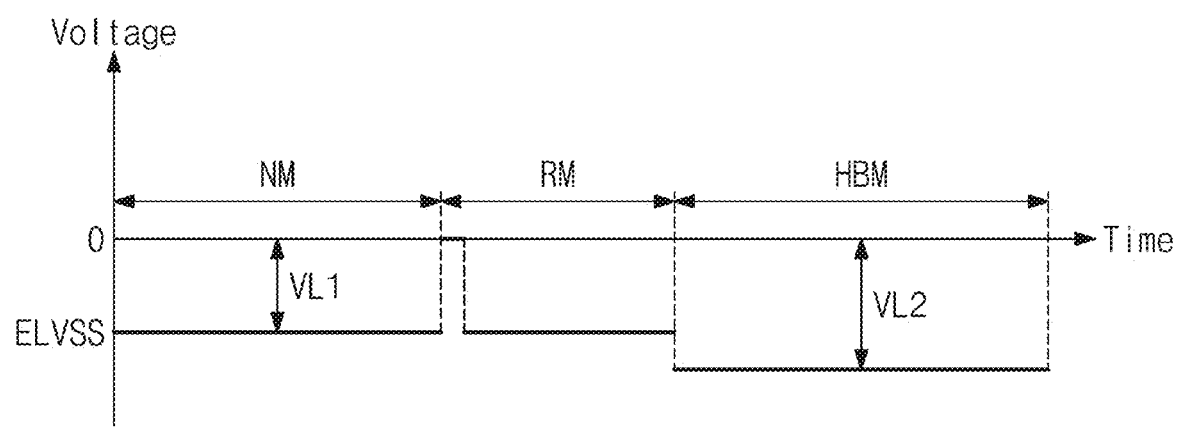
FIG. 8A is a graph illustrating a voltage level of a first driving voltage when a stabilization capacitor has an acceptable quality.
Figure 8B:
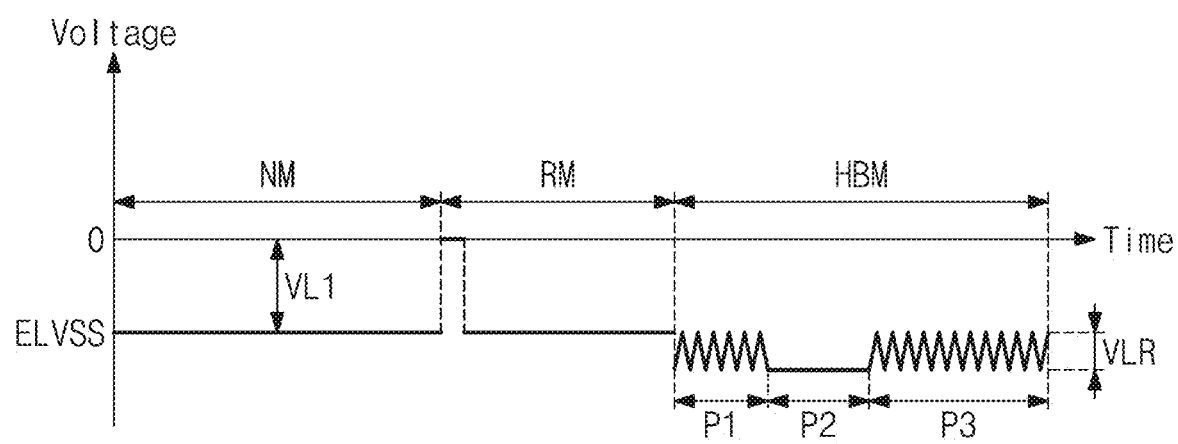
FIG. 8B is a graph illustrating a voltage level of a first driving voltage when a stabilization capacitor is faulty.

FIG. 8A is a graph illustrating a voltage level of a first driving voltage when a stabilization capacitor has an acceptable quality. FIG. 8B is a graph illustrating a voltage level of a first driving voltage when a stabilization capacitor is faulty. In FIGS. 8A and 8B, the horizontal axis represents a time, and the vertical axis represents a voltage.

Referring to FIGS. 4 to 8B, the display layer 100 may operate in a normal mode NM, a reset mode RM, and a high luminance mode HBM. An example in which the display layer 100 operates in order of the normal mode NM, the reset mode RM, and the high luminance mode HBM is illustrated in FIGS. 8A and 8B, but the present disclosure is not limited thereto.

In the normal mode NM, the power driving unit 1000P may provide the first driving voltage ELVSS having a first voltage level VL1 to the display layer 100. For example, the first voltage level VL1 may be −3 volts (V), but the present disclosure is not limited thereto. In the normal mode NM, the luminance of the display layer 100 may be 600 nit, but the present disclosure is not limited thereto.

In the reset mode RM, the power driving unit 1000P may provide the first driving voltage ELVSS having a given voltage level to the display layer 100. The given voltage level may be 0 V, but the present disclosure is not limited thereto. In the reset mode RM, the first driving voltage ELVSS may be provided as 0 V and then may be provided as the first voltage level VL1. In the reset mode RM, the display layer 100 may be initialized.

In the high luminance mode HBM, the power driving unit may provide the first driving voltage ELVSS having a second voltage level VL2 to 1000P the display layer 100. The second voltage level VL2 may be lower than the first voltage level VL1. For example, the second voltage level VL2 may be −4.2 V, but the present disclosure is not limited thereto. The display layer 100 may emit a light with higher luminance in the high luminance mode HBM than in the normal mode NM.

In the high luminance mode HBM, the display driving unit 100C may directly transmit the mode information MD to the sensor driving unit 200C. The mode information MD may refer information indicating that the display driving unit 100C drives the display layer 100 in the high luminance mode HBM.

When the sensor driving unit 200C receives the mode information MD, the sensor driving unit 200C may operate in the detection mode. In the detection mode, the sensor driving unit 200C may sense the voltage data VD obtained by measuring a voltage between the display layer 100 and the sensor layer 200.

In FIG. 8A, the stabilization capacitor Ces may have an acceptable quality. When the stabilization capacitor Ces has an acceptable quality, a fluctuation range VLR of the second voltage level VL2 may be less than a given fluctuation range.

The voltage data VD may be a voltage obtained by measuring a voltage between the second electrode CE and the sensing electrode SE. The voltage data VD may have a magnitude corresponding to the voltage level of the first driving voltage ELVSS.

The waveform of the voltage data VD sensed by the sensor driving unit 200C may be substantially the same as the waveform of the first driving voltage ELVSS illustrated in FIG. 8A. The sensor driving unit 200C may determine whether the stabilization capacitor Ces is faulty (or abnormal), based on the voltage data VD. In FIG. 8a, the fluctuation range VLR of the voltage data VD may be smaller than the given fluctuation range. When the fluctuation range VLR of the voltage data VD is smaller than the given fluctuation range, the sensor driving unit 200C may determine that the stabilization capacitor Ces has an acceptable quality. The given fluctuation range may be 1.5 V, but the present disclosure is not limited thereto.

In FIG. 8B, the stabilization capacitor Ces may be faulty (or as having an unacceptable quality). When the stabilization capacitor Ces is faulty, the fluctuation range VLR of the second voltage level VL2 may be the given fluctuation range or more.

In FIG. 8B, the high luminance mode HBM may include a first part P1, a second part P2, and a third part P3. In the first part P1 and the third part P3, the display layer 100 may express a white image IM (refer to FIG. 1). In the second part P2, the display layer 100 may express a black image IM (refer to FIG. 1).

The waveform of the voltage data VD sensed by the sensor driving unit 200C may be substantially the same as the waveform of the first driving voltage ELVSS illustrated in FIG. 8B. The sensor driving unit 200C may determine whether the stabilization capacitor Ces is faulty (or abnormal), based on the voltage data VD. In FIG. 8B, the fluctuation range VLR of the voltage data VD may be the given fluctuation range or more. When the fluctuation range VLR of the voltage data VD is the given fluctuation range or more, the sensor driving unit 200C may determine that the stabilization capacitor Ces is faulty.

According to the present disclosure, in the method for testing the electronic device 1000, when the sensor driving unit 200C receives the mode information MD, the sensor driving unit 200C may operate in the detection mode to test the stabilization capacitor Ces. The sensor driving unit 200C may determine whether the stabilization capacitor Ces is faulty (or abnormal), based on the voltage data VD. In the electronic device 1000 determined as having an acceptable quality by the electronic device test method, the stabilization capacitor Ces may remove an AC component from the first driving voltage ELVSS such that the noise which hinders the driving of the touch mode is not transferred to the sensor layer 200 through the first and second sensing capacitors Ctx and Crx. Accordingly, the electronic device 1000 with increased sensing reliability may be provided.

Also, according to the present disclosure, in the method for testing the electronic device 1000, when the sensor driving unit 200C receives the mode information MD, the sensor driving unit 200C may operate in the detection mode to test the stabilization capacitor Ces. The sensor driving unit 200C may determine whether the stabilization capacitor Ces is faulty (or abnormal), based on the voltage data VD. In the electronic device 1000 determined as having an acceptable quality by the electronic device test method, the stabilization capacitor Ces may remove a noise component capable of occurring at the first driving voltage ELVSS. The first driving voltage ELVSS with a uniform voltage level may be provided to the second cathode CE. Accordingly, the display device 100 with improved display quality may be provided.

According to the above description, in an electronic device test method, when a sensor driving unit receives mode information, the sensor driving unit may operate in a detection mode to test a stabilization capacitor. The sensor driving unit may determine whether a stabilization capacitor is faulty (or as having an unacceptable quality), based on voltage data. In an electronic device determined as having the acceptable quality by the electronic device test method, the stabilization capacitor may remove an AC component from a first driving voltage such that the noise which hinders the driving of the touch mode is not transferred to a sensor layer through first and second sensing capacitors. Accordingly, the electronic device with increased sensing reliability may be provided.

Also, according to the above description, in the electronic device test method, when the sensor driving unit receives the mode information, the sensor driving unit may operate in the detection mode. The sensor driving unit may determine whether a stabilization capacitor is faulty (or as having an unacceptable quality), based on the voltage data. In the electronic device determined as having the acceptable quality by the electronic device test method, the stabilization capacitor may remove a noise component capable of occurring at the first driving voltage. The first driving voltage with a uniform voltage level may be provided to a common electrode. Accordingly, an electronic device with improved display quality may be provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:
a display layer including a first electrode, a light emitting layer, and a second electrode;
a display driving unit configured to drive the display layer;
a sensor layer disposed on the display layer and including a sensing electrode;
a sensor driving unit configured to drive the sensor layer;
a power driving unit configured to provide a power supply voltage to the second electrode; and
a stabilization capacitor configured to control the power supply voltage,
wherein the sensor driving unit operates in a detection mode to sense voltage data obtained by measuring a voltage between the second electrode and the sensing electrode.

2. The electronic device of claim 1, wherein the display driving unit operates in a normal mode or a high luminance mode,
wherein, in the normal mode, the power supply voltage has a first voltage level, and
wherein, in the high luminance mode, the power supply voltage has a second voltage level lower than the first voltage level.

3. The electronic device of claim 2, wherein the display layer emits light with higher luminance in the high luminance mode than in the normal mode.

4. The electronic device of claim 2, wherein the display driving unit generates mode information,
wherein the display driving unit transmits the mode information to the sensor driving unit, and
wherein the mode information indicates that the display driving unit drives the display layer in the high luminance mode.

5. The electronic device of claim 4, wherein, when the sensor driving unit receives the mode information, the sensor driving unit operates in the detection mode.

6. The electronic device of claim 1, wherein the display layer includes a plurality of light emitting layers including the light emitting layer, and
wherein the plurality of light emitting layers are covered by the second electrode.

7. The electronic device of claim 1, wherein the sensor driving unit determines whether the stabilization capacitor is faulty based on the voltage data.

8. The electronic device of claim 1, wherein the sensing electrode includes a first sensing electrode and a second sensing electrode intersecting the first sensing electrode and insulated from the first sensing electrode.

9. The electronic device of claim 8, wherein the sensor driving unit further operates in a touch mode, and
wherein, in the touch mode, the sensor driving unit generates a driving signal to be transmitted to the first sensing electrode.

10. The electronic device of claim 8, wherein, in the detection mode, the first sensing electrode is electrically connected to a ground electrode.

11. A method of testing an electronic device comprising:
providing an electronic device that includes a display layer including a first electrode, a light emitting layer, and a second electrode, a display driving unit that drives the display layer, a sensor layer that includes a sensing electrode, a sensor driving unit that drives the sensor layer, a power driving unit that generates a power supply voltage, and a stabilization capacitor that controls the power supply voltage;
providing the power supply voltage to the second electrode;
sensing voltage data obtained by measuring a voltage between the second electrode and the sensing electrode; and
determining whether the electronic device has an acceptable quality based on the voltage data.

12. The method of testing the electronic device of claim 11, wherein the determining whether the electronic device has the acceptable quality based on the voltage data includes:
sensing a fluctuation range of the voltage data.

13. The method of testing the electronic device of claim 12, wherein the sensing the fluctuation range of the voltage data includes:
determining that the stabilization capacitor is faulty when the fluctuation range is greater than or equal to a given range.

14. The method of testing the electronic device of claim 13, wherein the sensing the fluctuation range of the voltage data further includes:
determining that the stabilization capacitor has the acceptable quality when the fluctuation range is less than the given range.

15. The method of testing the electronic device of claim 11, further comprising:
operating the display layer in a normal mode or a high luminance mode,
wherein, in the normal mode, the power supply voltage of the display layer has a first voltage level, and wherein, in the high luminance mode, the power supply voltage of the display layer has a second voltage level lower than the first voltage level.

16. The method of testing the electronic device of claim 15, wherein the display layer emits light with a higher luminance in the high luminance mode than in the normal mode.

17. The method of testing the electronic device of claim 15, further comprising:

generating, by the display driving unit, mode information to be transmitted to the sensor driving unit, wherein the mode information indicates that the display driving unit drives the display layer in the high luminance mode.

18. The method of testing the electronic device of claim 17, wherein the sensing the voltage data is performed after the sensor driving unit receives the mode information.

19. The method of testing the electronic device of claim 11, wherein the sensing electrode includes a first sensing electrode, and a second sensing electrode intersecting the first sensing electrode and insulated from the first sensing electrode, and wherein the electronic device test method further comprises:

generating, by the sensor driving unit, a driving signal to be transmitted to the first sensing electrode.

20. The method of testing the electronic device of claim 19, wherein the sensing of the voltage data includes:

activating a switch to connect the second sensing electrode to a ground electrode.

\* \* \* \* \*